Jan. 22, 1963
V. W. WEEKMAN, JR
3,074,879
CATALYTIC CONVERSION OF LIQUID HYDROCARBONS
IN THE PRESENCE OF SUSPENDED CATALYST
Filed Dec. 10, 1959
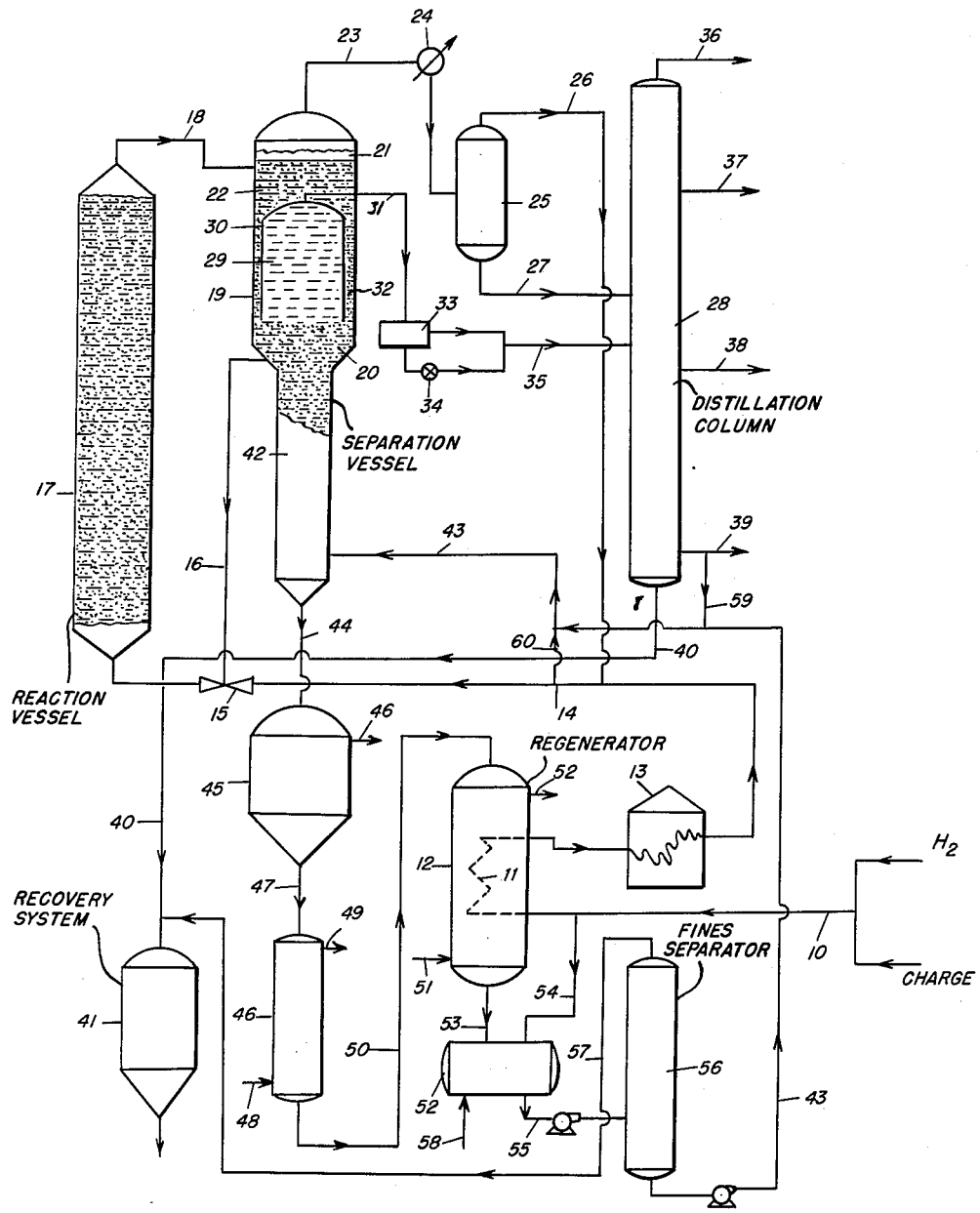
INVENTOR.
Vern W. Weekman, Jr.
BY
Andrew L. Gabriault
Attorney United States Patent Office 3,074,879
Patented Jan. 22, 1963

3,074,879
CATALYTIC CONVERSION OF LIQUID HYDROCARBONS IN THE PRESENCE OF SUSPENDED CATALYST
Vern W. Weekman, Jr., Woodbury, N.J., assignor to Socony Mobil Oil Company, Inc., a corporation of New York
Filed Dec. 10, 1959, Ser. No. 858,681
5 Claims. (Cl. 208—176)

This invention deals with the catalytic conversion of liquid hydrocarbons in the presence of finely divided solid catalytic material.

Typical of the processes to which this invention may be applied are the catalytic cracking, hydrogenation and hydrocracking of high boiling hydrocarbons, a large portion of which remain liquid under the reaction conditions, to produce lower boiling products, such as gasoline and fuel oil.

The present invention applies particularly to reactions of the foregoing type in which conditions are such that the catalyst used is not immediately deactivated for further use in the reaction. In such operations it has been the prior art practice to arrange the catalyst in fixed accumulations or "beds" through which the reactant is passed under conditions of temperature and pressure appropriate to effect the desired conversion. The catalyst becomes gradually less active through the deposit of carbonaceous contaminants thereon and, eventually, the operation is shut down and the catalyst regenerated by removing carbonaceous contaminants therefrom. This need for periodic shut-downs is, of course, one disadvantage of fixed bed operations.

Another disadvantage is that any given catalyst particle is always subjected to reactant in the same condition. Thus, some particles contact only fresh charge; others contact only reactant as it leaves the bed. This may lead to undesirable temperature differentials along the length of the bed. It has also been shown to result in uneven deposition of carbonaceous contaminants through the length of the bed.

The prior art has also suggested that hydrocracking might be conducted with finely divided catalyst suspended in the liquid reactant. The most common practice here was to employ a very inexpensive catalyst which was filtered out of the liquid product and discarded. Sometimes this catalyst was recycled through the reaction zone a number of times before being discarded. There was also the suggestion that periodically the entire body of catalyst or a representative fraction thereof might be transferred to a regeneration zone for reconditioning. The former case has the disadvantage of requiring a large regeneration system which was only used a part of the time. Where a representative fraction was regenerated continuously, the operation was inefficient in that many of the catalyst particles passed to the regeneration zone were not sufficiently contaminated to need regeneration while many particles returned to the reaction system were severely deactivated.

This invention is an improvement on the cracking system which utilizes catalyst in a slurry. In this operation a part of the catalyst is continuously regenerated and returned to the reaction zone. A particular method of separating the catlyst to be regenerated from the remainder, operates to send to the regeneration zone only the catalyst having the larger amount of carbonaceous contaminant thereon. By this means a smaller regeneration system may be used to maintain a given catalyst activity in the reaction zone.

A major object of this invention is to provide an efficient method for converting a liquid hydrocarbon reactant in the presence of a finely divided catalyst suspended in the liquid.

Another object of this invention is to provide an operation for the continuous catalytic conversion of hydrocarbons in the presence of hydrogen.

Another object of this invention is to provide a continuous process for regeneration of a portion of catalyst particles containing differing quantities of carbonaceous contaminant in which the portion regenerated comprises the catalyst particles with the largest carbonaceous contaminant deposits.

Another object is to provide a continuous hydrocracking operation in which solid catalyst, suspended in the reactant, is continuously moved through the reaction zone and the portion of the catalyst most heavily contaminated is continuously separated from the remainder, regenerated and returned to the reaction zone.

In this invention a hydrocarbon reactant, with a suitable catalyst suspended therein, is passed through a reaction zone to effect the desired conversion while depositing carbonaceous contaminants on the catalyst. Gaseous materials are separated from the reaction zone effluent while the remaining liquid is passed to a liquid separation zone. In the liquid separation zone, the liquid is moved upwardly at a velocity below the velocity which will suspend catalyst particles of a size desired to be retained in the circulating system. The liquid is withdrawn from the upper section of this separation zone. The solids are then passed into a solids separation zone. A portion of the charge liquid is passed upwardly through the solids separation zone at a velocity which is sufficient to suspend the catalyst particles with lower amounts of carbonaceous contaminants but insufficient to suspend catalyst particles with greater amounts of carbonaceous contaminants. The particles which are suspended in this manner are passed into the reaction zone. The catalyst particles which settle out are passed to a reconditioning zone wherein the carbonaceous contaminant is removed therefrom. These particles are then returned to the reaction zone.

This invention will be best understood by referring to the attached diagrammatic drawing, showing the flow plan of a process employing this invention.

The drawing illustrates the application of this invention to hydrocracking of hydrocarbons. A hydrocarbon charge and hydrogen enter through line 10. They are heated by passage through a heat transfer coil 11 maintained within a regenerator 12. They are then brought to the desired reaction temperature, which typically will be within the range 750° F. to 950° F., in furnace 13. The heated reactants flow, by means of line 14, through an eductor 15 which draws a catalyst slurry from line 16 into the reactant stream. The slurry of catalyst and reactants passes into the lower end of reaction vessel 17 and upwardly therethrough to effect the desired conversion. During the course of this reaction carbonaceous contaminants will be deposited on the catalyst. The quantity of such deposits is not normally such that all of the catalyst must be regenerated after each passage through the reaction zone. Much of the catalyst will be effective for hydrocracking even after it has been through the reaction zone a number of times. Also, it should be pointed out that the quantity of carbonaceous contaminant deposited on individual catalyst particles will vary even when particles have passed through the reaction zone the same number of times.

The reaction zone effluent passes through line 18 into an elongated vessel 19. Most of the length of vessel 19 is occupied by a continuous liquid column 20 with a gas plenum space 21 above column 20 in the upper end of vessel 19.

The upper portion 22 of column 20 functions as a gas separation zone. Materials which are in the gaseous phase in the reactor effluent will separate here and pass into gas space 21 to be withdrawn through line 23. This gaseous material will include hydrogen as well as any hydrocarbon product which is in the vapor phase. This stream is then cooled to condense the vapor hydrocarbons by cooler 24 and supplied to separation vessel 25. The remaining gases, consisting predominantly of hydrogen, are taken overhead through line 26 and returned to the reaction system through lines 26 and 14. Liquid is passed from vessel 25 through line 27 to distillation column 28.

Returning to vessel 19, the central section 29 of liquid column 20 acts as a liquid separation zone. This zone is primarily enclosed within an inverted hood 30. Liquid is withdrawn from the upper end of the hood through line 31. Liquid and solid catalyst descend from the vapor separation zone 22 through the annular space 32 between the outside wall of hood 30 and the inner wall of vessel 19. The liquid then reverses direction and flows upwardly through zone 29. The liquid velocity in zone 29 is insufficient to entrain catalyst particles of a size desired for use in the cyclic system. This separation is materially assisted by the downward acceleration which the particles receive as they pass downwardly through annular space 32.

The liquid product taken through line 31 is passed to a flow control device 33. The device shown here is described and claimed in United States patent application 832,950, filed August 11, 1959, now Patent No. 2,945,801. Briefly, this device consists of a fixed orifice through which the major portion of the liquid and any catalyst fines pass. Precise adjustment of the liquid rate is then achieved by means of valve 34. Fines are kept away from valve 34 by a suitably arranged screen (not shown). Any other suitable flow control device may, of course, be used, such as an ordinary valve.

The liquid material then flows into distillation column 28 through line 35. In the distillation column the liquid is divided into any desired products. For example, gas may be removed through line 36, a naphtha through 37, a domestic heating oil through 38, and a heavy gas oil at 39. A bottoms fraction, which will consist predominantly of catalyst fines carried into the column 28 from vessel 19, is removed through line 40. This stream may be passed to a fines recovery system 41 which operates with standard techniques, such as filtration, centrifuging or settling.

Returning now to vessel 19, the lower portion of column 20 functions as a solids separation zone 42. A portion of the liquid charge is supplied to the lower end of zone 42 through passage 43 or 60. This liquid is passed upwardly through zone 42 at a velocity sufficient to suspend or entrain the lighter catalyst particles which enter this zone from zone 29, but insufficient to entrain heavier catalyst particles.

This separation of catalyst in zone 42 effectively separates the catalyst with higher deposits of carbonaceous contaminants from the particles with lower deposits. This separation may readily be controlled by adjusting the upward liquid velocity in zone 42 to entrain particles with less than a given amount of carbonaceous contaminant thereon. This velocity control may, of course, be effected by controlling the quantity of liquid admitted to zone 42 through lines 43 and 60.

This separation is particularly effective, it is believed, because the carbonaceous contaminant deposits primarily in the catalyst pores rather than on the exterior surface of the particles. Thus, particles of identical size may be separated on the basis of contaminant content. The higher activity catalyst (lower contaminant) passes out of vessel 19 through passage 16, from which it will be returned to reaction zone 17 as previously described.

The less active catalyst (higher contaminant) settles to the bottom of vessel 19 and is withdrawn through passage 44. The carbonaceous contaminant is then removed from the catalyst. This removal may be accomplished by first supplying this catalyst to a settling vessel in which additional liquid hydrocarbon may be settled from the catalyst. Excess liquid may be removed through line 46.

The catalyst flows from vessel 45 to vessel 46 through line 47. In vessel 46 the catalyst is treated to remove any adhering liquid hydrocarbons. This treatment may, for example, involve subjecting the catalyst to high temperature steam, for example, at 650° F., admitted at 48 to vaporize the hydrocarbons and sweep the vapor from vessel 46. Steam and hydrocarbon vapor may be removed at 49.

The catalyst then is passed through line 50 to regenerator 12, in which carbonaceous contaminants are removed from the catalyst by any suitable means. Typically, this removal is effected by burning the contaminant with air admitted at 51. Flue gas is removed at 52. The regeneration zone will advantageously be operated in a continuous manner with the catalyst in a moving mass or fluidized bed condition.

The regenerated catalyst is passed to vessel 52 through line 53. Make-up catalyst, if desired, may be added through line 58. Liquid charge is also admitted to vessel 52 through lines 10 and 54 to form a slurry with the catalyst. This slurry is pumped through line 55 to a fines separation vessel 56. Some liquid may be taken overhead through line 57 and carry with it the undesirable catalyst fines. This stream may then be passed to the fines recovery system 41. This slurry with regenerated catalyst flows to vessel 19 through line 43. This stream may be joined by recycle heavy gas oil from line 59 or fresh feed from line 60.

The advantages of this invention are believed readily apparent. Since continuous regeneration is used, the more active, more expensive catalyst may be used. However, since only a fraction of the catalyst in circulation is regenerated at any one time, a modestly sized regeneration vessel may be used. Efficiently is further promoted because in this operation the fraction regenerated is a selected one containing only the most heavily contaminated particles. Furthermore, the selection of this fraction is achieved in a practical, economical manner. It is to be noted that this selection separates heavily contaminated particles which are capable of being returned to an effective condition. Applicant's process does not achieve separation of only particles which have a high density because they have been permanently damaged by overheating and are not, therefore, capable of re-use in the process.

Catalysts useful in this invention will, of course, depend upon the particular reaction desired to be promoted. Suitable catalysts are, in general, porous materials. If it is desired primarily to achieve cracking, the catalyst typically might be a natural or treated clay or a synthetic association of silica, alumina or magnesia or combinations thereof.

If hydrogenation is desired, the catalyst will usually be a hydrogenation component, such as the metals of the iron or platinum series, or their oxides or sulfides, deposited on a relatively inert base such as alumina.

Catalysts suitable for hydrocracking, a process with which this invention will find particular favor, will generally have one or more components which promote hydrogenation, such as a platinum series metal or iron series metal, or their oxides or sulfides, associated with a cracking component, such as a silica-alumina composite. Among the preferred hydrocracking catalysts is that described and claimed in United States patent application serial No. 760,646, filed September 12, 1958. This catalyst is a composite of 15–40 percent by weight silica, 3–20 percent by weight molybdenum trioxide, 1–8 percent by weight cobalt oxide and the remainder alumina. Another preferred catalyst is that described and claimed in United States patent application Serial No. 825,016, filed July 6, 1959, now Patent No. 2,945,806. This catalyst is made up of 0.05–20 percent by weight of platinum series metal deposited on an active cracking base, such as silica-alumina.

A variety of factors enter into the proper upward velocities to be used in zones 29 and 42. Among these factors are the size, density and shape of the catalyst particles and the viscosity and density of the upwardly flowing fluid. Calculation of the liquid velocities to be used in these zones may be made by application of conventional laws of hindered settling. For example, in catalytic hydrocracking of heavy hydrocarbons, the upward liquid velocity in zone 29 should generally not exceed 30 feet per minute.

The liquid velocity to be used in zone 42 will depend, in addition to the factors noted above, on the carbonaceous contaminant content level at which it is desired to separate catalyst for regeneration. For hydrocracking of heavy hydrocarbons this content will usually be at least 5–10 percent by weight of the catalyst and less than 50 percent by weight of the catalyst. The upward velocity in zone 42 will normally be within the range 0.1 to 22 feet per minute and the liquid flowing upwardly through zone 42 will usually have a density falling within the range 10 to 50 pounds per cubic foot at the temperature in zone 42.

The catalyst used in this invention should not be so fine, on the one hand, nor so large on the other that separation of catalyst in zone 42 cannot be accomplished at practical liquid velocities. Generally, the size of this catalyst should be within the range 5 to 200 mesh Tyler and preferably 10 to 100 mesh Tyler. The solid material making up catalysts useful in this invention will usually have a density within the range 90 to 300 pounds per cubic foot.

The conditions within reaction zone 17 may, of course, be varied to suit the particular application of the invention. For hydrocracking or hydrogenation, the temperature in the reaction zone should usually be within the range 750° F. to 1000° F., the pressure from a few hundred pounds per square inch to 10,000 p.s.i.g., the molar ratio of hydrogen to hydrocarbon within the range 5 to 20 and preferably 5 to 10, and the catalyst to oil ratio within the range 0.5 to 5 volumes of catalyst per volume of oil.

Where the reaction is at an advanced pressure, it is usually desirable to maintain vessel 19 under the same pressure and provide a conventional means associated with line 44 to effect reduction in pressure at that point, since the regeneration will normally be conducted with most advantage at pressures near atmospheric.

Line 44 should also be designed to minimize substantial downflow of liquid supplied through passage 43.

Hydrocarbon charge stock of almost any type may be used in this invention. It will find particular application with stocks which will be predominantly in the liquid phase under the reaction conditions, such as residual materials boiling above 800° F. at atmospheric pressures.

*Example*

For hydrocracking a heavy gas oil boiling above 800° F., a catalyst comprising the oxides of cobalt, molybdenum, silica and alumina might be used. The catalyst particles would range in size from 20 to 28 mesh Tyler, and the density in air of the catalyst particles would be 90 pounds per cubic foot. The density of the solid material making up the catalyst might be 200 pounds per cubic foot. Reactions conditions would be:

| | |
|---|---|
| Temperature, ° F. | 800 to 900 |
| Pressure, p.s.i.g. | 1500 |
| Catalyst to oil volume ratio | 3 |
| Charge rate, bbl./day | 10,000 |

A cylindrical reactor 7 feet in diameter and 92 feet high might be used. Vessel 19 might be 3 feet in diameter and 10 feet long in its lower section to accommodate the operation of zone 42.

Maintenance of a liquid velocity of 1.4 feet per minute in zone 42 would suspend all catalyst particles having less than 25 percent carbonaceous contaminant by weight and settle out the more heavily contaminated particles. The regenerator might be operated at 1000° F. to 1400° F. to burn the contaminant from the catalyst within.

This invention should be understood to include all changes and modifications of the examples of the invention, herein chosen for purposes of disclosure, which do not constitute departures from the spirit and scope of the invention.

I claim:

1. In a continuous process for the catalytic conversion of hydrocarbons, wherein the hydrocarbons in liquid phase are passed through a reaction zone with particles of solid catalyst suspended in said liquid to form a slurry and said hydrocarbons and catalyst are subjected to hydrocracking reaction conditions in said reaction zone to convert said hydrocarbons, at least in part, to lower boiling products and deposit carbonaceous contaminants on the catalyst, the improved method for maintaining said catalyst in an active condition, which comprises: separating vapor from the effluent of said reaction zone and passing the remaining liquid and solid catalyst to a liquid separation zone; withdrawing liquid from the upper section of said liquid separation zone while catalyst particles settle to the bottom thereof, the upward velocity of liquid in said liquid separation zone being insufficient to suspend catalyst particles of a size suitable to be retained in the cyclic system; passing the solid catalyst into a solids separation zone and flowing at least a portion of the hydrocarbons to be charged to the reaction zone upwardly through said solids separation zone at a velocity which is insufficient to suspend the heavier catalyst particles bearing the higher quantities of carbonaceous contaminants but is sufficient to suspend the lighter catalyst particles which bear lower amounts of carbonaceous contaminants; passing the hydrocarbon charge carrying the catalyst with lower amounts of carbonaceous contaminants into the reaction zone to be converted; passing the catalyst with higher amounts of carbonaceous contaminants into a regeneration zone and removing said contaminants therein and returning catalyst with contaminants removed from the regeneration zone to the reaction zone.

2. The process of claim 1 further limited to the catalyst which contains the higher amount of carbonaceous contaminant bears a quantity of carbonaceous contaminant amounting to at least 5–10 percent by weight of the catalyst.

3. In a process for the catalytic hydrocracking of high boiling liquid hydrocarbons to lower boiling products wherein hydrogen and hydrocarbon charge, with a catalyst suitable to promote hydrocracking suspended therein, are passed upwardly through a reaction zone under hydrocracking reaction conditions to effect conversion of at least a part of said charge to lower boiling products, the improvement which comprises: passing the reaction zone effluent from the upper section of said reaction zone into the upper section of an upright, elongated separation housing; maintaining the major fraction of said housing filled with liquid and maintaining a gas space in the upper section of said housing; continuously withdrawing gaseous material from the upper end of said housing while liquid and solids descend through the upper section of said column; maintaining a liquid plenum space, closed on top and sides within the upper section of said housing with upper end below the surface of said column; withdrawing liquid from the upper end of said plenum space so that liquid which has descended through the upper section of said column will enter the lower end of said plenum space and flow upwardly therethrough; maintaining the upward liquid velocity in said plenum space insufficient to suspend catalyst particles of a size suitable for retention in the cyclic system; supplying a portion of the liquid hydrocarbon to be converted to the lower section of said column and passing said liquid upwardly through said column at a velocity sufficient to suspend catalyst having a quantity of carbonaceous contaminant less than about 5–10 percent by weight but insufficient to suspend catalyst having a quantity of carbonaceous contaminant greater than 50 percent by weight; removing liquid charge with suspended catalyst from an intermediate level in said column below the lower end of said plenum space and supplying said liquid charge and catalyst to said reaction zone; removing catalyst from the lower end of said housing and removing carbonaceous contaminant therefrom and returning said catalyst to the reaction zone.

4. The process of claim 3 further limited to the reconditioned catalyst being mixed with a part of the hydrocarbon charge and the resulting slurry then supplied to the lower section of the liquid column to induce the upward velocity in the lower section of the column.

5. In a continuous process for the conversion of liquid hydrocarbons, wherein the hydrocarbons are passed in liquid phase through a reaction zone with particles of solid catalyst suspended in said liquid under conversion conditions which result in carbonaceous contaminants being deposited on the catalyst in amounts which are insufficient to render the catalyst inactive after one passage through the reaction zone, the improved method for maintaining said catalyst in an active condition, which comprises: separating vapor from the effluent of said reaction zone and passing the remaining liquid and solid catalyst to a liquid separation zone; withdrawing liquid from the upper section of said liquid separation zone while catalyst particles settle to the bottom thereof, the upward velocity of liquid in said liquid separation zone being insufficient to suspend catalyst particles of a size suitable to be retained in the cyclic system; passing the solid catalyst into a solids separation zone and flowing at least a portion of the hydrocarbons to be charged to the reaction zone upwardly through said solids separation zone at a velocity which is insufficient to suspend the heavier catalyst particles bearing the higher quantities of carbonaceous contaminants but is sufficient to suspend the lighter catalyst particles which bear lower amounts of carbonaceous contaminants; passing the hydrocarbon charge carrying catalyst with lower amounts of carbonaceous contaminants into the reaction zone to be converted; passing the catalyst with higher amounts of carbonaceous contaminants into a regeneration zone and removing said contaminants therein and returning catalyst with contaminants removed from the regeneration zone to the reaction zone.

References Cited in the file of this patent

UNITED STATES PATENTS

| | | |
|---|---|---|
| 2,631,968 | Peery | Mar. 17, 1953 |
| 2,862,873 | Hall | Dec. 2, 1958 |
| 2,909,476 | Hemminger | Oct. 20, 1959 |
| 2,944,961 | McAfee | July 12, 1960 |
| 2,968,614 | Brooks et al. | Jan. 17, 1961 |